(12) United States Patent
Lu

(10) Patent No.: US 10,602,871 B2
(45) Date of Patent: Mar. 31, 2020

(54) INFUSER

(71) Applicant: YUKAWA ENTERPRISE CO., LTD, Hemei Township, Changhua County (TW)

(72) Inventor: Yi-Tzu Lu, Hemei Township, Changhua County (TW)

(73) Assignee: YUKAWA ENTERPRISE CO., LTD, Hemei Township, Changhua County (TW)

( * ) Notice: Subject to any disclaimer, the term of this patent is extended or adjusted under 35 U.S.C. 154(b) by 325 days.

(21) Appl. No.: 15/784,574

(22) Filed: Oct. 16, 2017

(65) Prior Publication Data

US 2019/0110631 A1 Apr. 18, 2019

(51) Int. Cl.
*A47J 31/06* (2006.01)

(52) U.S. Cl.
CPC ............ *A47J 31/06* (2013.01); *A47J 31/0605* (2013.01)

(58) Field of Classification Search
CPC ............................................. A47J 31/06–0652
See application file for complete search history.

(56) References Cited

U.S. PATENT DOCUMENTS

| 6,058,827 | A   | * | 5/2000  | Lin Tien | A47J 31/061 99/299 |
| 6,192,786 | B1  | * | 2/2001  | Gasser   | A47J 31/0647 99/319 |
| 9,999,314 | B1  | * | 6/2018  | Neace    | A47J 31/002 |
| 2012/0160107 | A1 | * | 6/2012  | Tien     | A47J 31/061 99/298 |
| 2013/0019754 | A1 | * | 1/2013  | Tien     | A47J 31/061 99/279 |
| 2018/0296025 | A1 | * | 10/2018 | Pan      | A47J 31/20 |

* cited by examiner

*Primary Examiner* — Michael A Laflame, Jr.
(74) *Attorney, Agent, or Firm* — Egbert, McDaniel & Swartz, PLLC

(57) ABSTRACT

An infuser includes a base having a cylindrical mounting base mounted on the base, a rotating ring surrounding the mounting base, a tubular structure with perforated top and bottom axially mounted on the top surface of the mounting base by liquid seal and a spring axially mounted between the base and rotating ring by precompression. The spring underprops the rotating ring permanently. A through flow channel is formed axially in the mounting base. The rotating ring is provided with a waterstop block. The waterstop block closes the flow channel by liquid seal. When the rotating ring rotates against the mounting base, it performs axially reciprocating motion against the mounting base at the same time. The waterstop block opens the flow channel optionally, the liquid in the tubular structure flows down through the flow channel.

11 Claims, 11 Drawing Sheets

INFUSER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an infuser, and more particularly to an innovative structure type controlling the open-close state of the infuser flow channel rotationally.

2. Description of Related Art Including Information Disclosed Under 37 CFR 1.97 and 37 CFR 1.98

An infuser is quite a common structure. It can unfold tea leaves without the complicated procedure of infusion in a pottery pot, and the tea is separated from the tea leaves during drinking. It is a generally accepted infusing tool, especially for the busy working professionals, it is a simple tea infusing tool to make tea at any time.

In terms of the existing infuser, a concave cup bottom is formed at the bottom of the cup body, a discharge orifice is drilled in the center of the cup bottom, and a waterstop ball is located in the cup bottom and embedded in the top of the discharge orifice, so as to close the discharge orifice optionally. An ejector rod is located upward in the center of extension tray corresponding to the discharge orifice, the ejector rod underprops the waterstop ball to open the discharge orifice.

Thus, to overcome said problems of the prior art, it would be an advancement in the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The base, mounting base, rotating ring and spring form the innovative structure type and technical characteristic of the infuser disclosed in the present invention, so that as compared with the prior art, the technical means using the continuous push of the spring and rotation to change the horizontal height of the waterstop block against the mounting base can be used to implement the practical progress in controlling the open-close state of infuser flow channel.

DETAILED DESCRIPTION OF THE INVENTION

Figure 1:
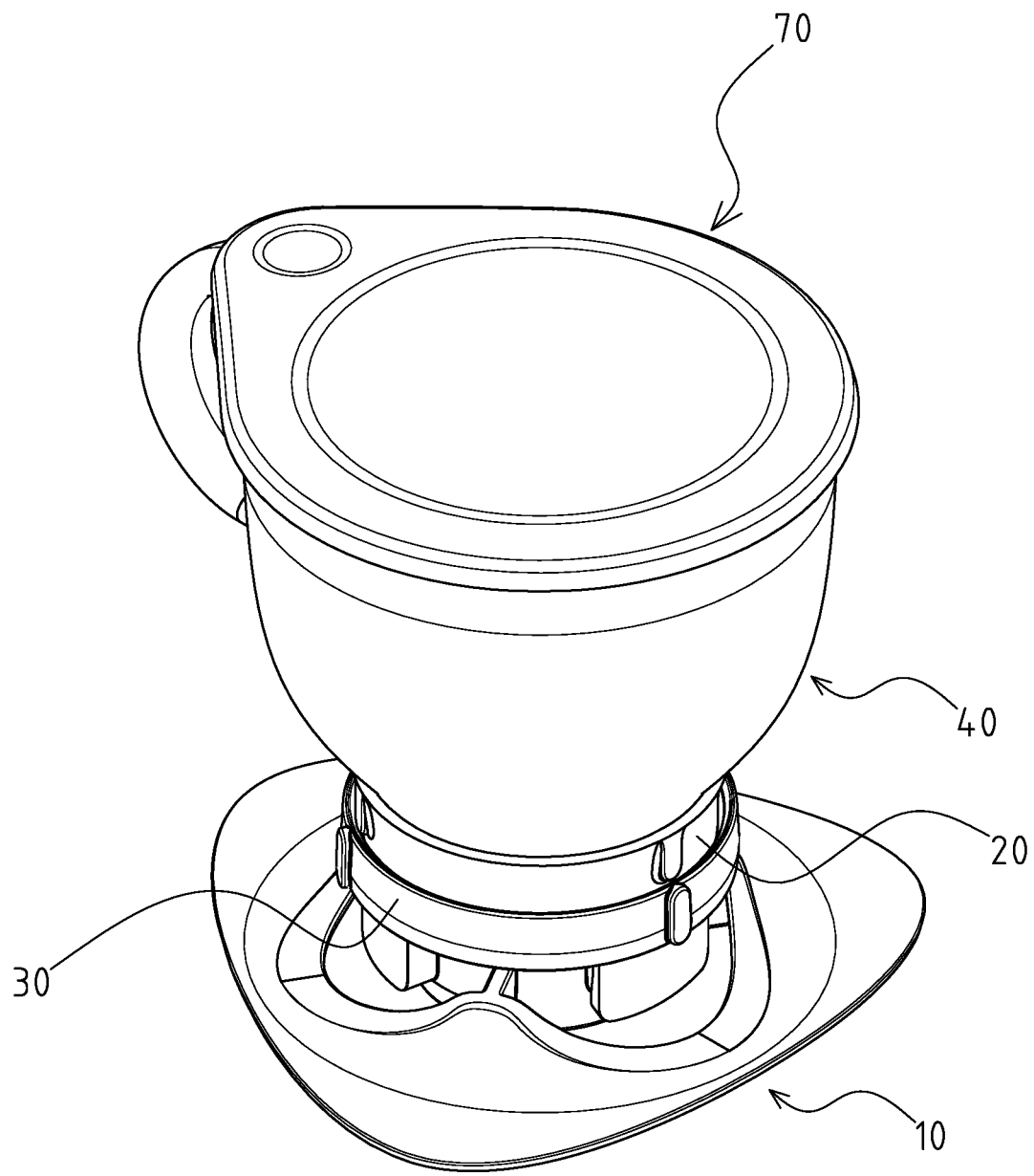
FIG. 1 is a three-dimensional outside view of the present invention.
Figure 2:
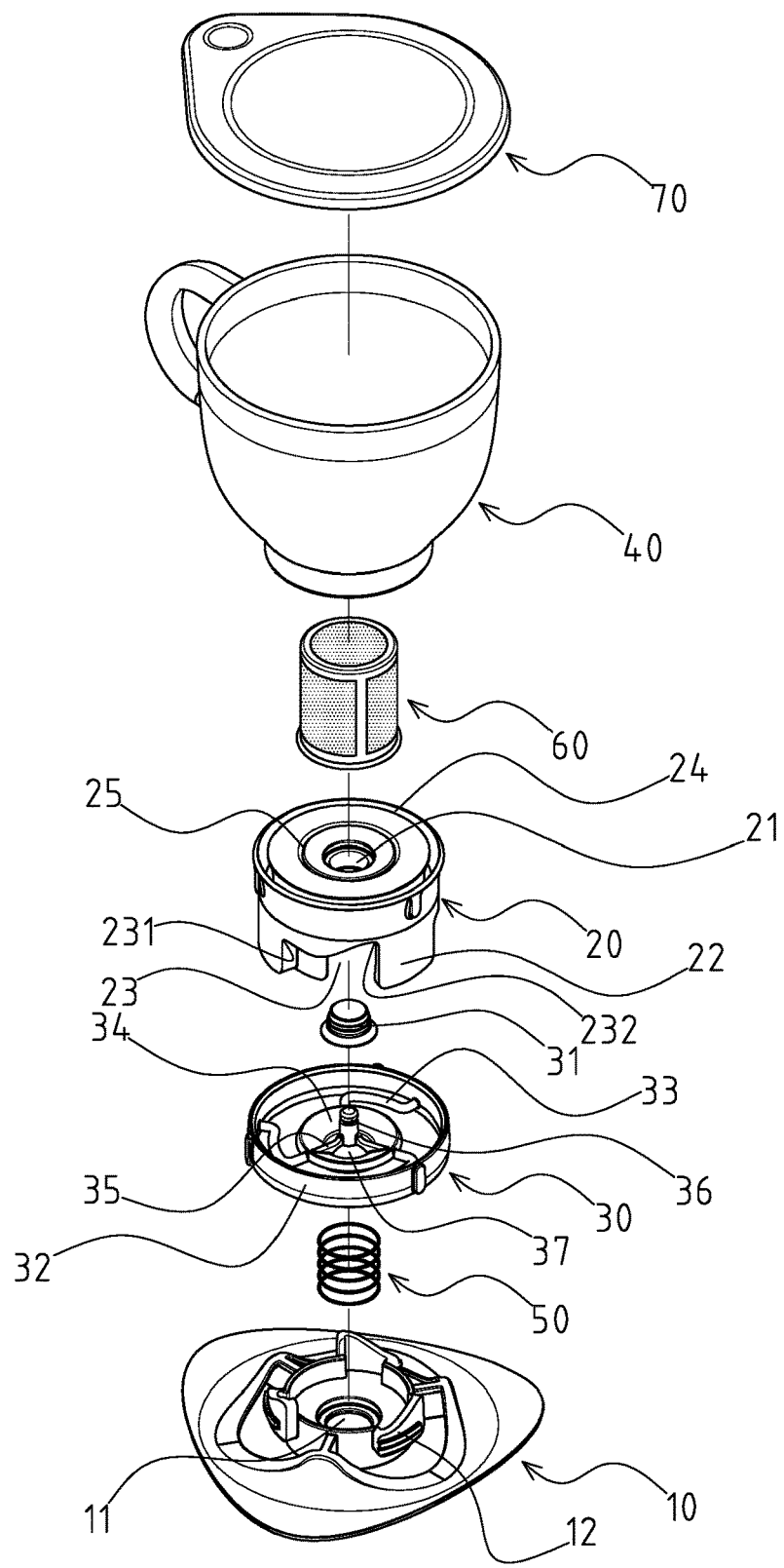
FIG. 2 is a three-dimensional exploded view of the present invention.
Figure 3:
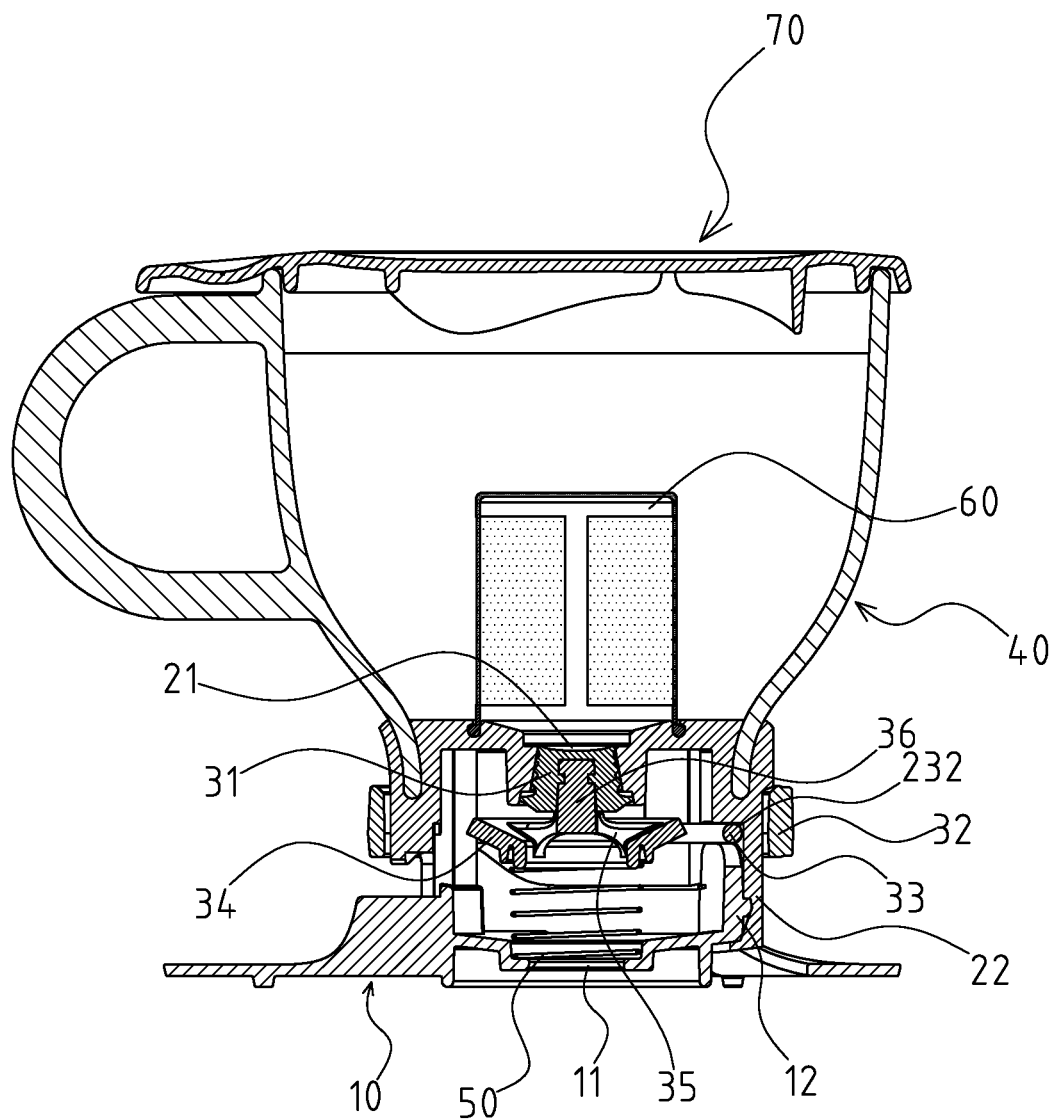
FIG. 3 is a sectional view of the present invention in a waterstop state.

FIGS. 1, 2 and 3 show the preferred embodiments of the infuser of the present invention, but these embodiments are for illustration only, the patent application is not limited to this structure. Said infuser comprises a base 10, a cylindrical mounting base 20 mounted on the base 10, a rotating ring 30 located around the mounting base 20, a tubular structure 40 with perforated top and bottom axially mounted on the top surface of the mounting base 20 by liquid seal and a spring 50 axially mounted between the base 10 and rotating ring 30 by precompression. The spring 50 underprops the rotating ring 30 permanently to axially locate the rotating ring 30. A through flow channel 21 is formed axially in the mounting base 20. The rotating ring 30 is provided with a waterstop block 31. The waterstop block 31 closes the flow channel 21 by liquid seal. When the rotating ring 30 rotates against the mounting base 20, it performs axially reciprocating motion against the mounting base 20 at the same time, the waterstop block 31 opens the flow channel 21 optionally, and the liquid in the tubular structure 40 flows downward through the flow channel 21.

The base 10 is a saucer-like structure with a punch hole 11, and the top surface of the base 10 is provided with plural positioning structures 12 surrounding the punch hole 11.

There are plural extension parts 22 extended downward from the underside of the mounting base 20, and a slot 23 is formed between every two adjacent extension parts 22. The bottom surface of the slot 23 has a first end 231 and a second end 232. Each extension part 22 is fixed to a corresponding positioning structure 12, and the horizontal height of the second end 232 is greater than the horizontal height of the first end 231. The top surface of the mounting base 20 is provided with a first ring groove 24 and a second ring groove 25 surrounding the flow channel 21. The diameter of the second ring groove 25 is smaller than the diameter of the first ring groove 24, and surrounded by the first ring groove 24.

Figure 5:
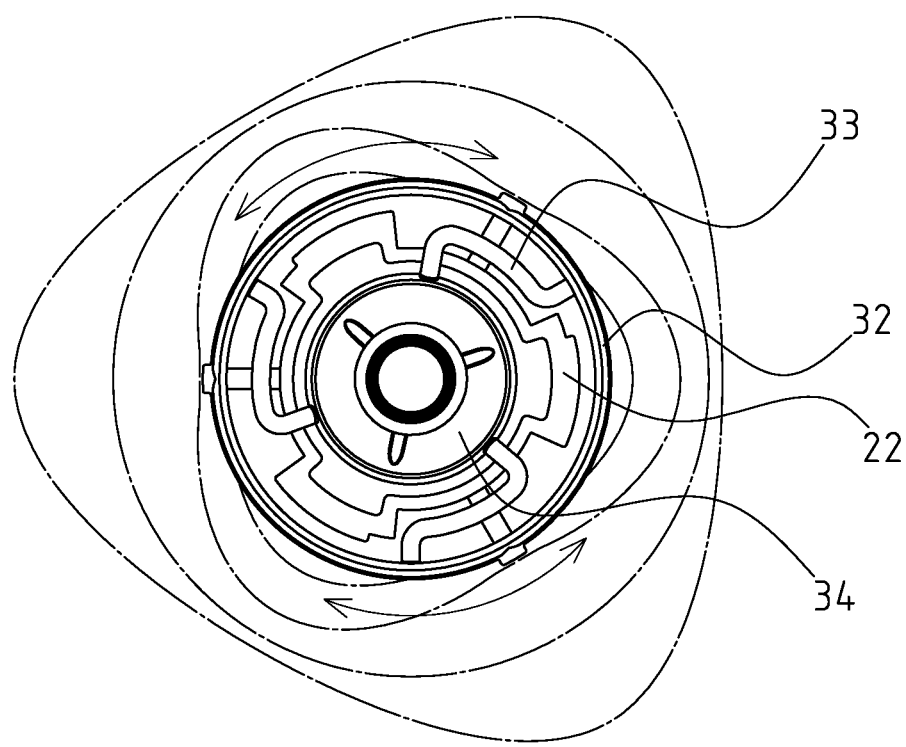
FIG. 5 is a schematic diagram of rotating ring rotating against base of the present invention.

The rotating ring 30 comprises a first ring body 32 surrounding the mounting base 20. The inner edge of the first ring body 32 is provided with plural ejector rods 33 extending inward, and the free end of each ejector rod 33 is connected to a second ring body 34. Each ejector rod 33 spans a corresponding slot 23. Please refer to FIGS. 5, 6 and 7, when the first ring body 32 rotates against the mounting base 20, each ejector rod 33 reciprocates between the first end 231 and the second end 232 on the bottom surface of the corresponding slot 23, so as to change the horizontal height of the rotating ring 30. The inner edge of the second ring body 34 is provided with plural ribs 35 extending inward. A hollow area 37 is formed between every two adjacent ribs 35. The free end part of each rib 35 is connected to a cylinder 36. The cylinder 36 extends towards the mounting base 20 and it is concentric with the flow channel 21. The waterstop block 31 is mounted on the free end part of the cylinder 36.

Figure 4:
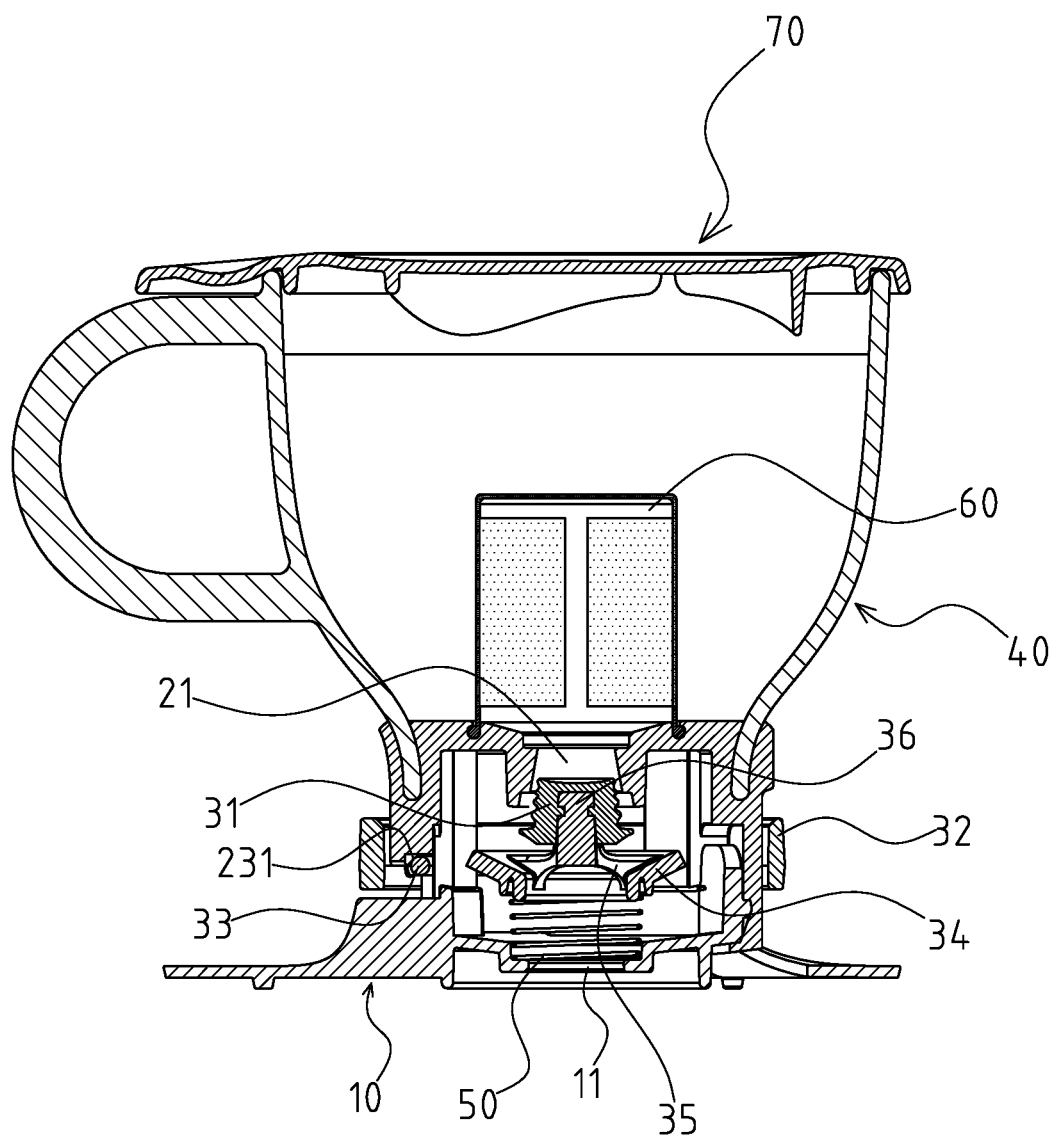
FIG. 4 is a sectional view of the present invention with the flow channel opened.
Figure 4A:
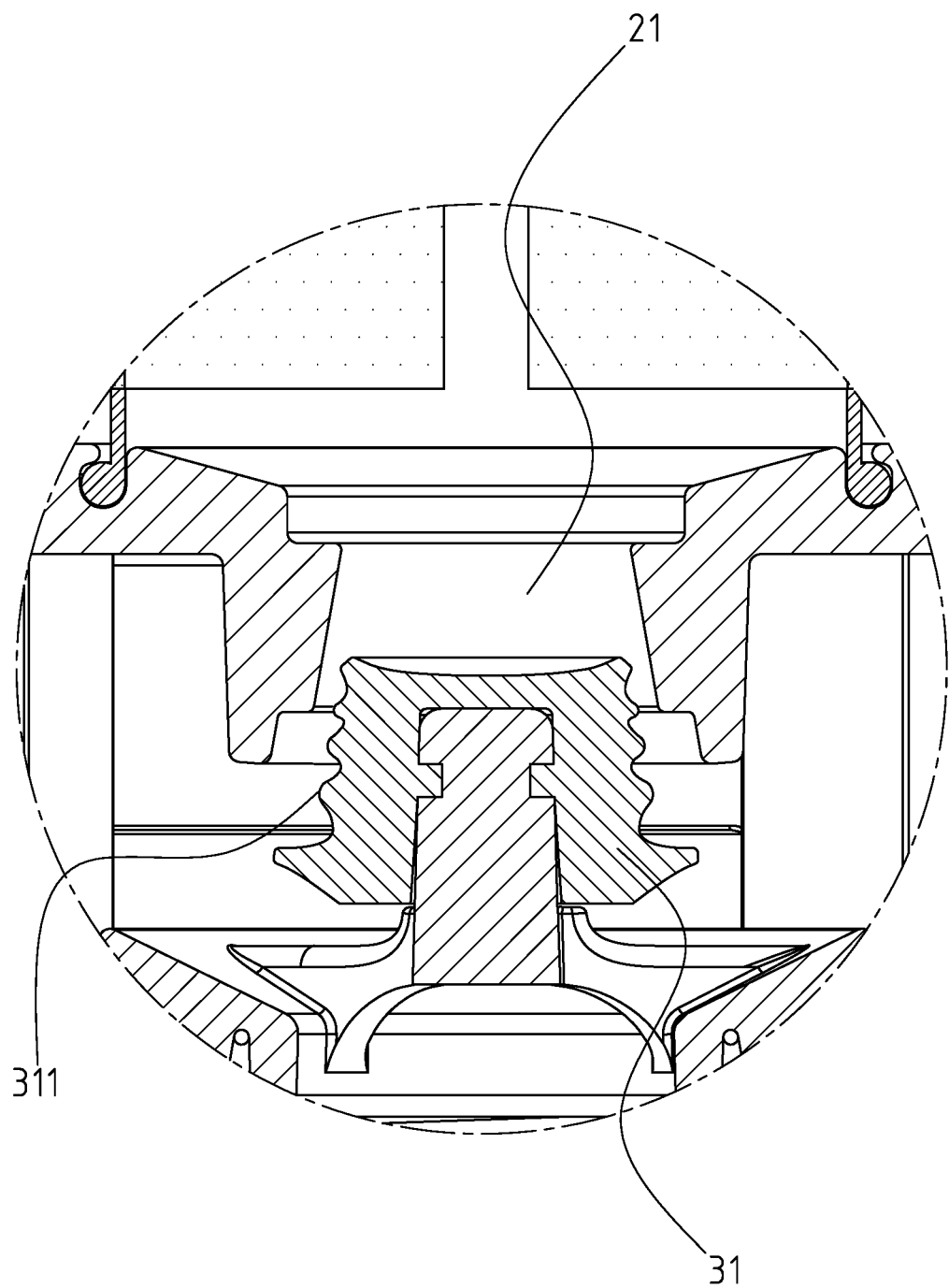
FIG. 4A is a close-up view of FIG. 4.

Referring to FIG. 4A, in this preferred embodiment, the flow channel 21 is a coniform space in diameter increasing gradually downward, and the contour of the waterstop block 31 is set according to the sectional shape of the flow channel 21. The surface of the waterstop block 31 is horizontally provided with at least a stop ring 311. The stop ring 311 clings to the inner wall of the flow channel 21 optionally, so as to close the flow channel 21 by liquid seal.

The bottom edge of the tubular structure 40 is located in the first ring groove 24 by liquid seal. In addition, the preferred embodiment of this invention has a filter screen 60 and a cover body 70. The filter screen 60 is a cylindrical structure with downward opening, and its bottom edge is located in the second ring groove 25 by liquid seal. The cover body 70 seals the top edge of the tubular structure 40 optionally to avoid dirt falling into the tubular structure 40.

Figure 6:
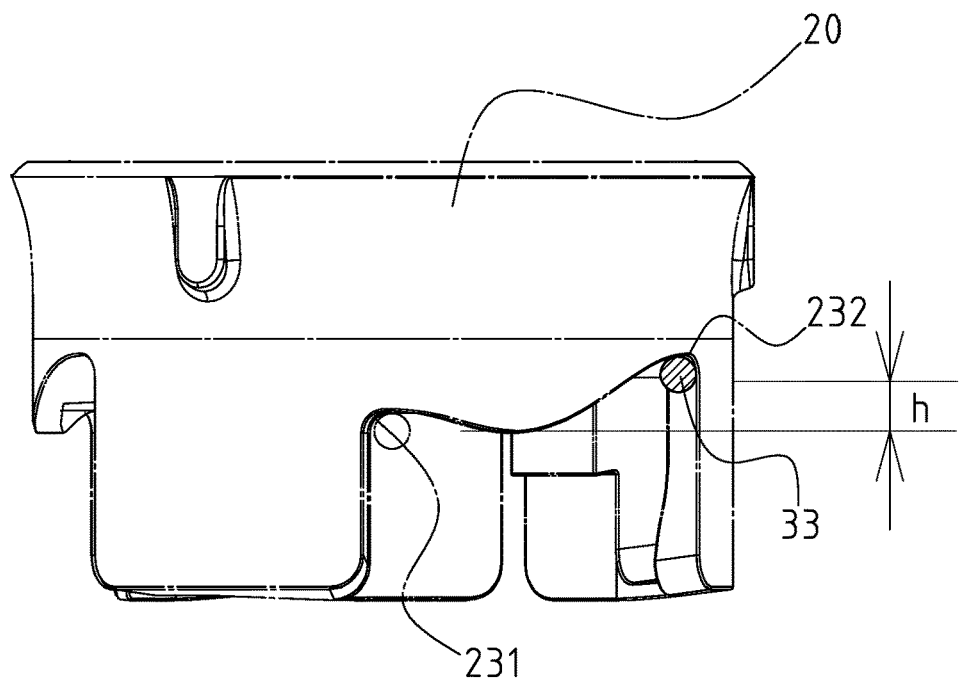
FIGS. 6 and 7 are schematic diagrams of horizontal heights of the ejector rod in relation to the mounting base before and after the flow channel is opened of the present invention.
Figure 7:
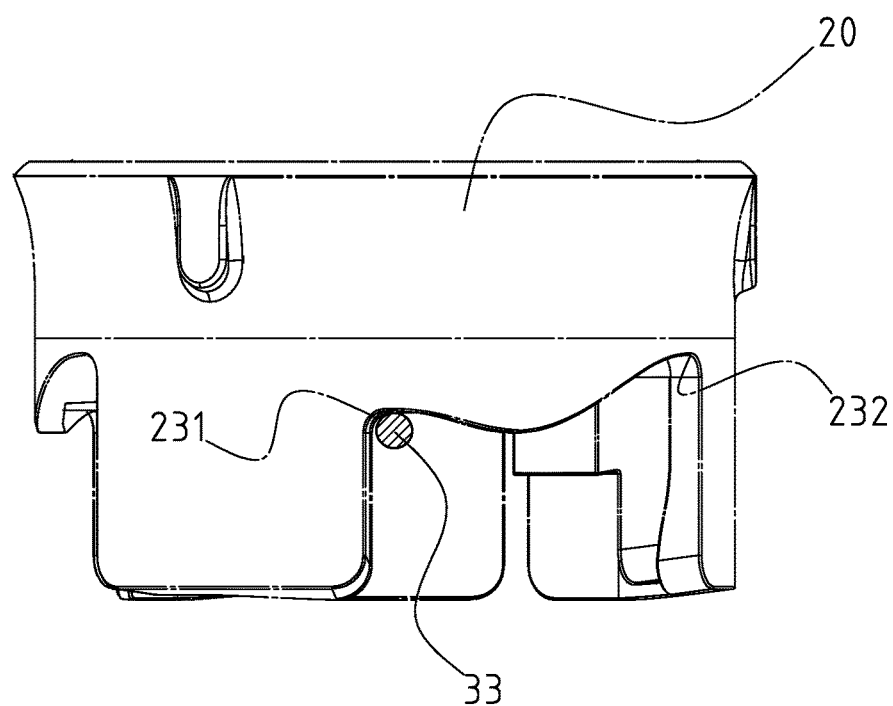

By said structural composition design, the actuation of the present invention is described below. As the spring 50 keeps ejecting upward, each ejector rod 33 supports the bottom surface of the corresponding slot 23 constantly. As shown in FIGS. 3 and 6, when each ejector rod 33 supports the second end 232 on the bottom surface of the corresponding slot 23, the rotating ring 30 is higher than the mounting base 20, the waterstop block 31 is taken to the high point accordingly, and the at least one stop ring 311 closes the flow channel 21 upward from the lower part of the flow channel 21. As shown in FIGS. 4 and 7, when the rotating ring 30 rotates against the mounting base 20, and each ejector rod 33 supports the first end 231 on the bottom surface of the corresponding slot 23, the rotating ring 30 is lower than the mounting base 20, and the waterstop block 31 is taken to the low point accordingly, and the spring 50 is further compressed, the flow channel 21 is opened from the lower part of the flow channel 21. As shown in FIGS. 6 and 7, the maximum height difference h of vertical shift of each ejector rod 33 is the horizontal height difference between the first end 231 and the second end 232 of each slot 23.

Figure 8:
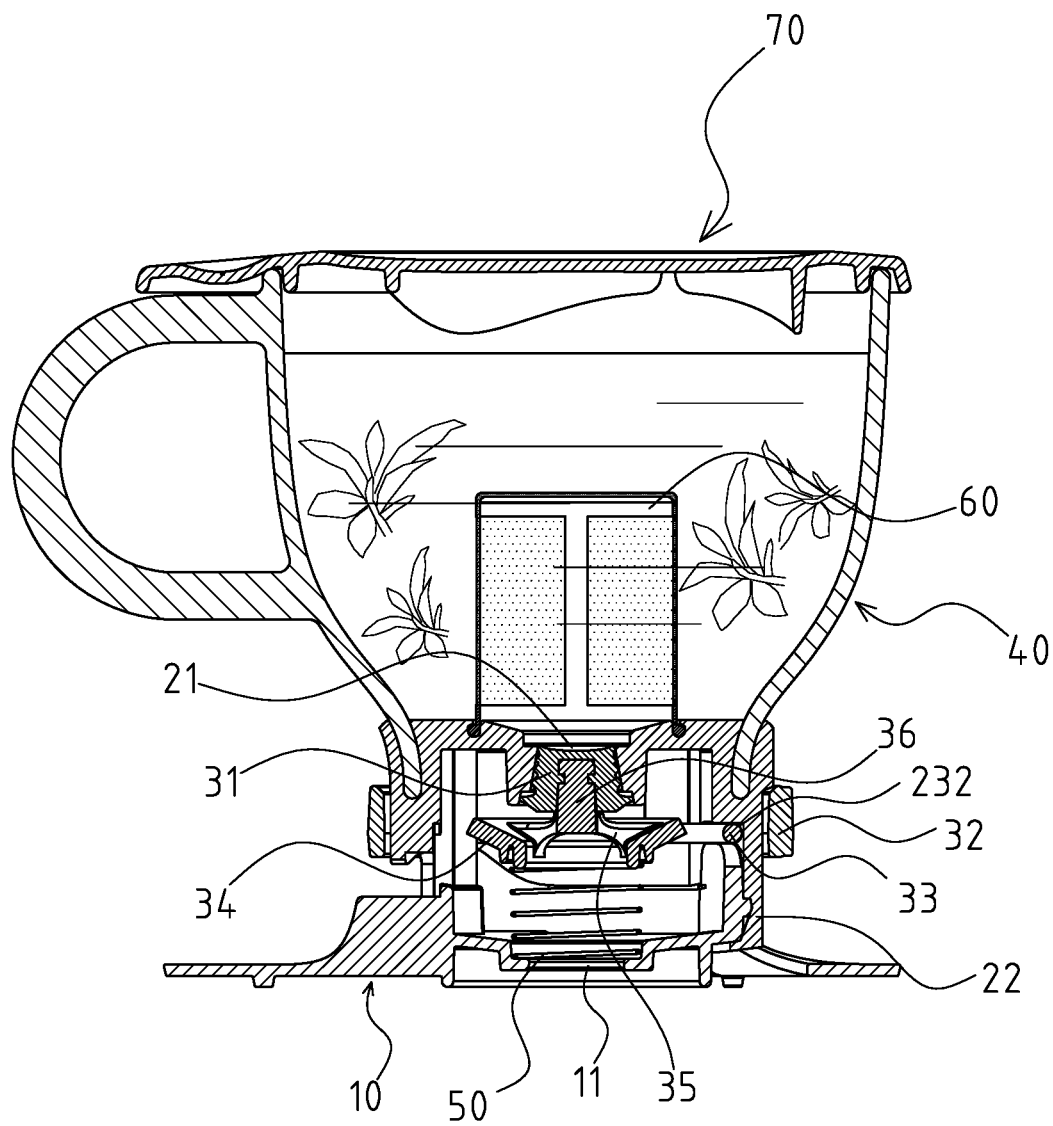
FIG. 8 is a schematic diagram in section view of the present invention infusing tea.
Figure 9:
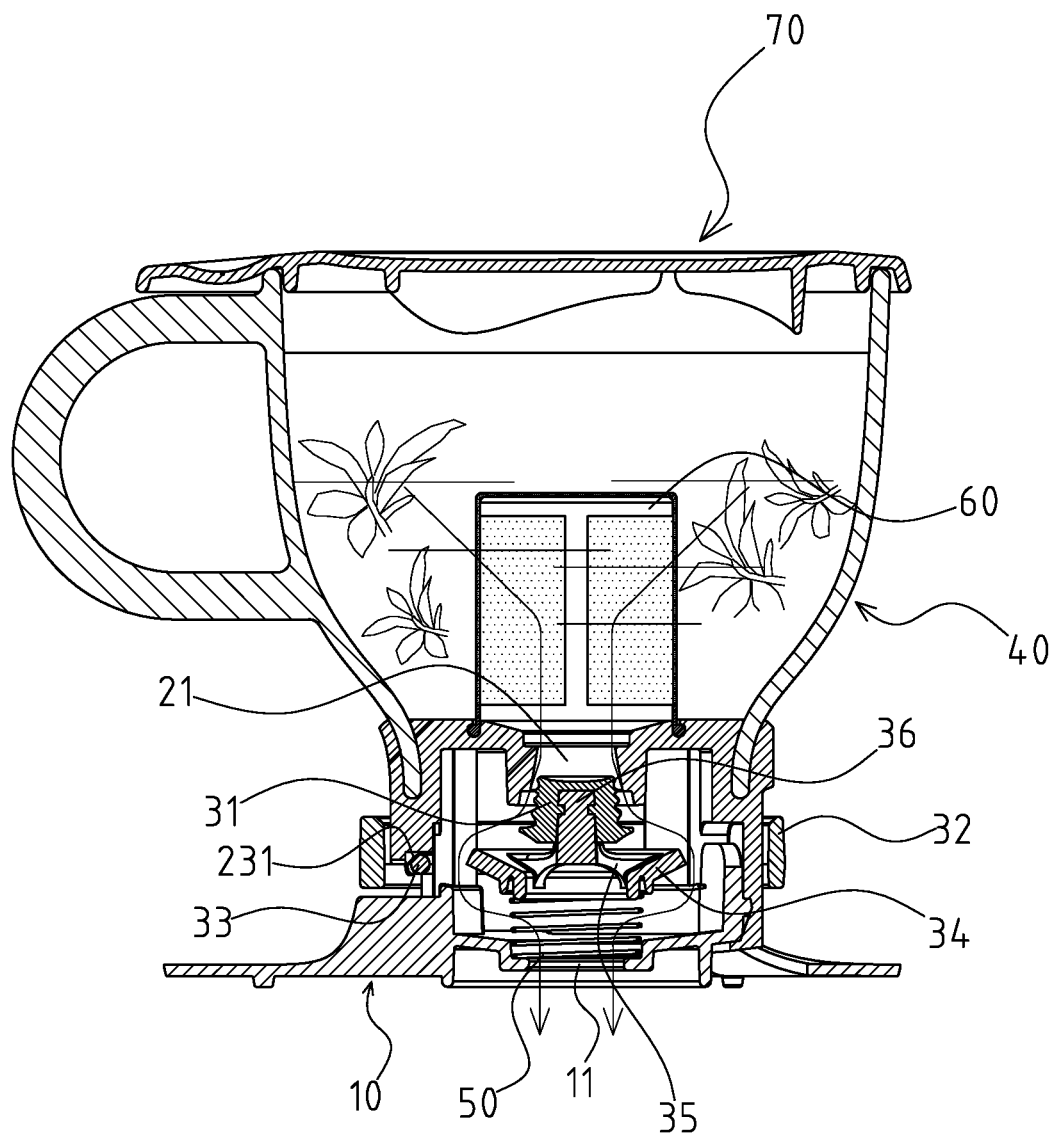
FIG. 9 is a schematic diagram of the present invention discharging water from the lower part of container.

By said structural composition design, the service condition of the present invention (e.g. infusing tea) is described below. Referring to FIGS. 3, 6 and 8, as stated above, when each ejector rod 33 supports the second end 232 on the bottom surface of the corresponding slot 23, the waterstop block 31 closes the flow channel 21 from bottom to top under the underpropping effect of the spring 50. When the present invention is used to infuse tea, the tea leaves are put in the tubular structure 40, infused with hot water and covered with the cover body 70, sealing the top of the tubular structure 40. When the tea is flavorous, as shown in FIGS. 4, 7 and 9, the rotating ring 30 is turned against the mounting base 20, let each ejector rod 33 move from the second end 232 on the bottom surface of the corresponding slot 23 to the first end 231, let the rotating ring 30 move to the relatively low point against the mounting base 20, compelling the waterstop block 31 to move down against the mounting base 20. Let the at least one stop ring 311 depart from the inner wall of the flow channel 21, the flow channel 21 is opened from the lower part of the flow channel 21, so that the flavorous tea in tubular structure 40 flows into the prepared container through the flow channel 21, hollow area 37 of rotating ring 30 and the punch hole 11 in the base 10 in turn. The filter screen 60 lets the tea pass smoothly and retains the spread tea leaves, to avoid the spread tea leaves blocking the flow channel 21 or flowing out of the present invention along with tea.

Figure 10:
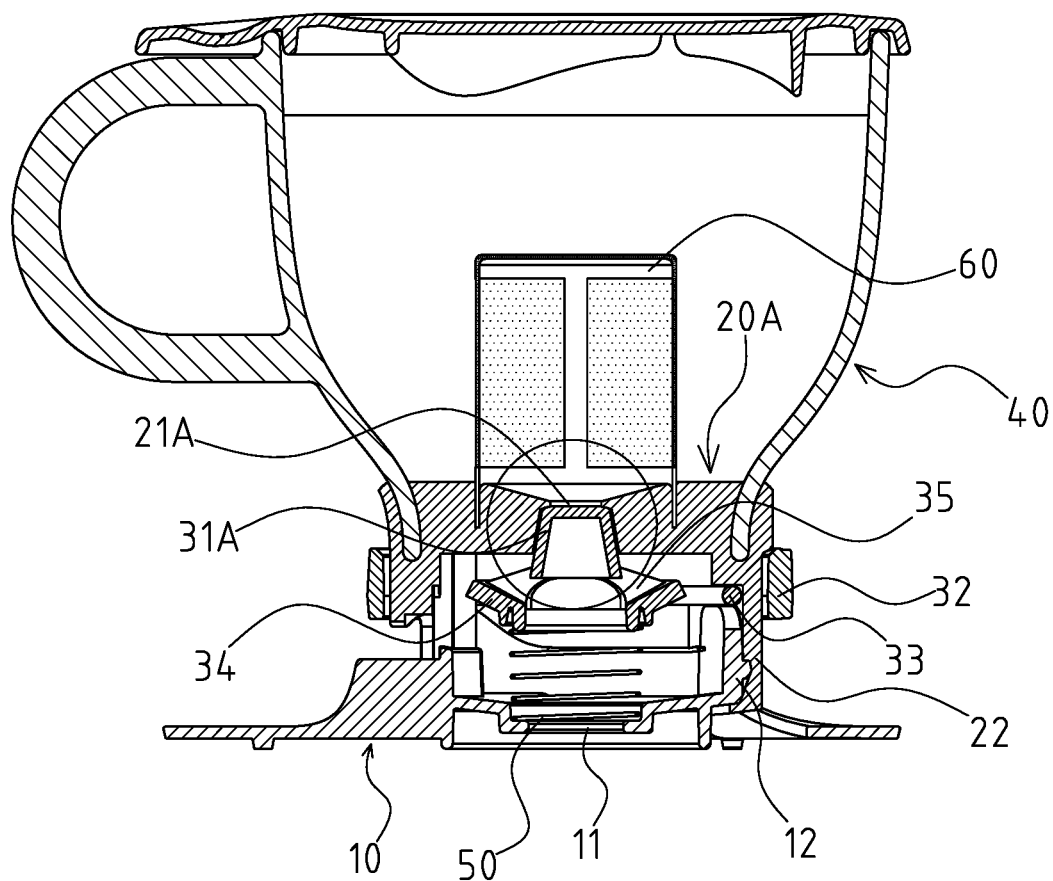
FIG. 10 is a sectional view of the second preferred embodiment of the present invention.
Figure 11:
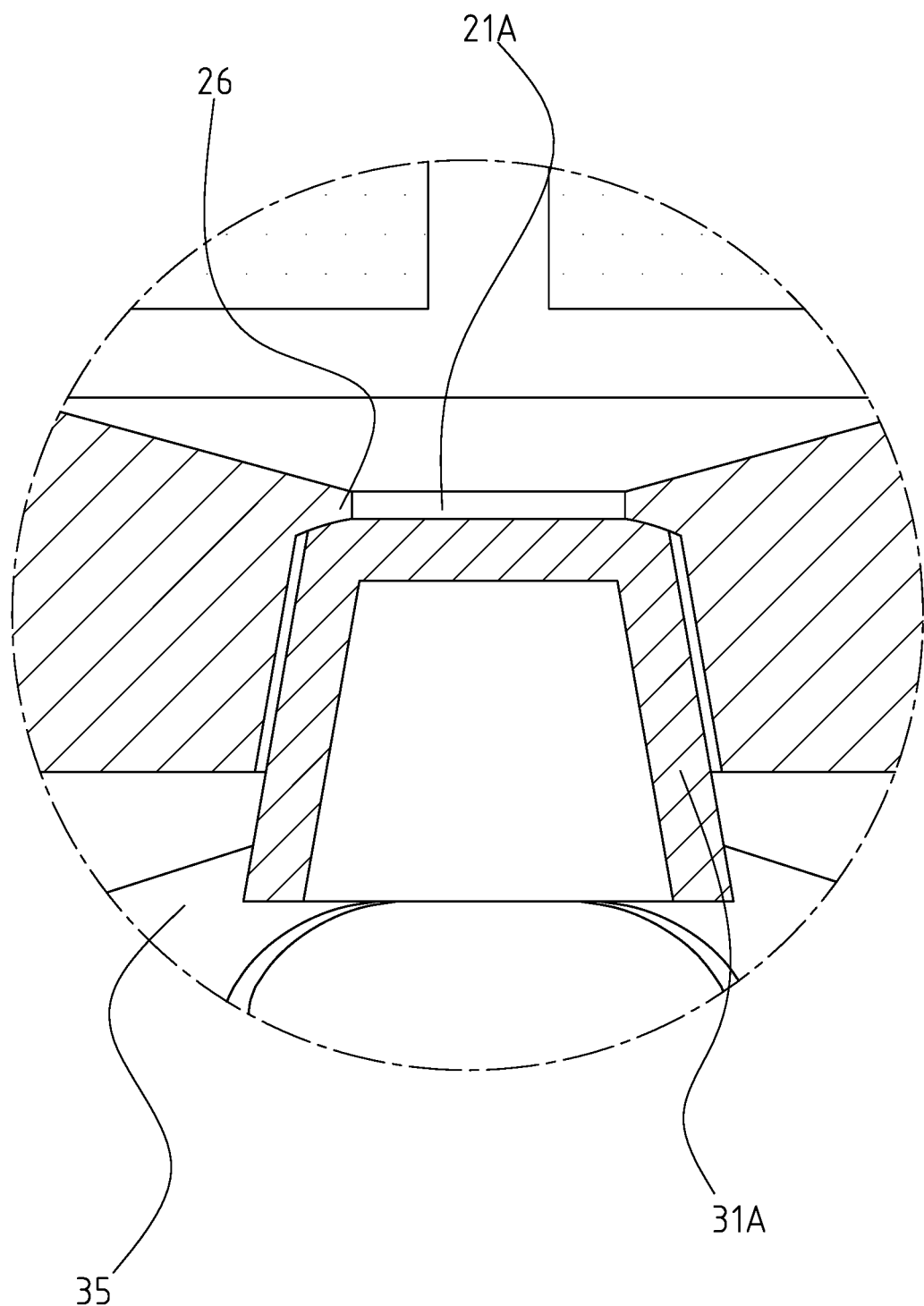
FIG. 11 is a close-up section view of the second preferred embodiment of the present invention.

FIGS. 10 and 11 show the second preferred embodiment of the present invention. In this preferred embodiment, the waterstop block 31A is integrated with the plural ribs 35. The mounting base 20A provides a retaining lip 26 circling the inner wall of the flow channel 21A. The top of the waterstop block 31A clings to the underside of the retaining lip 26, so as to close the flow channel 21A by liquid seal. The operation mode and usage mode of this preferred embodiment are identical with the first preferred embodiment.

I claim:

1. An infuser comprising:
    a base having a punch hole, said base having a plurality of positioning structures at a top surface thereof, the plurality of positioning structures surrounding the punch hole;
    a cylindrical mounting base mounted on said base, said cylindrical mounting base having a plurality of extension parts extending downwardly from an underside of said cylindrical mounting base, the plurality of extension parts having a slot formed between every two adjacent extension parts of said plurality of extension parts, the slot having a bottom surface with a first end and a second end, each of the plurality of extension parts being fixed to a corresponding positioning structure of said plurality of positioning structures, a horizontal height of the first end of the slot being greater than a horizontal height of the second end of the slot;
    a tubular structure having a perforated top and a perforated bottom, said tubular structure being axially mounted by a liquid seal on a top surface of said cylindrical mounting base;
    a rotating ring surrounding said cylindrical mounting base, said rotating ring comprising:
        a first ring body surrounding said cylindrical mounting base, said first ring body having a plurality of ejector rods extending inwardly from an inner edge of said first ring body;
        a second ring body connected to a free end of each of said plurality of ejector rods, each of the plurality of ejector rods reciprocating between the first end and the second end on the bottom surface of the slot when said first ring body rotates against said cylindrical mounting base so as to change the horizontal height of said rotating ring against said cylindrical mounting base, a maximum height difference of a vertical shift of each of said plurality of ejector rods is equal to a horizontal height difference between the first end and the second end of the slot; and
    a waterstop block cooperative with a flow channel such that when each of said plurality of ejector rods is in the second end on the bottom surface of the slot said waterstop block closes the flow channel, said waterstop block selectively opening the flow channel when each of said plurality of ejector rods is in the first end on the bottom surface of the slot; and a spring axially mounted in compression between said base and said rotating ring, wherein said spring underprops said rotating ring constantly so as to axially position said rotating ring.

2. The infuser of claim 1, wherein a plurality of ribs extend inwardly from an inner edge of the second ring body, a hollow area being formed between every two adjacent ribs of said plurality of ribs, a free end part of each of said plurality of ribs being connected to a cylinder, the cylinder extending towards said cylindrical mounting base and being concentric with the flow channel, said waterstop block being mounted on a free end part of the cylinder.

3. The infuser of claim 2, wherein the flow channel is a coniform space with a diameter increasing gradually downwardly, a contour of said waterstop block corresponding to a sectional shape of the flow channel, a surface of the waterstop block being horizontally provided with at least one stop ring, the stop ring selectively clinging to an inner wall of the flow channel so as to close the flow channel.

4. The infuser of claim 1, wherein a plurality of ribs extend inwardly from an inner edge of the second ring body, a hollow area being formed between every two adjacent ribs of the plurality of ribs, said waterstop block being integrated with said plurality of ribs.

5. The infuser of claim 4, wherein said cylindrical mounting base has a retaining lip circling an inner wall of the flow channel, said waterstop block having a top clinging to the underside of the retaining lip so as to close the flow channel.

6. The infuser of claim 3, wherein a top surface of said cylindrical mounting base has a first ring groove surrounding the flow channel, a bottom edge of said tubular structure being positioned in the first ring groove.

7. The infuser of claim 5, wherein a top surface of said cylindrical mounting base has a first ring groove surrounding the flow channel, a bottom edge of said tubular structure being positioned in the first ring groove.

8. The infuser of claim 6, further comprising:
a filter screen mounted on the top surface of said cylindrical mounting base.

9. The infuser of claim 7, further comprising:
a filter screen mounted on the top surface of said cylindrical mounting base.

10. The infuser of claim 8, wherein the top surface of the mounting base has a second ring groove surrounding the flow channel, a diameter of the second ring groove being smaller than a diameter of the first ring groove, the second ring groove being surrounded by the first ring groove, said filter screen being a cylindrical structure with a downward opening, a bottom edge of said filter screen being positioned in the second ring groove.

11. The infuser of claim 9, wherein the top surface of the mounting base has a second ring groove surrounding the flow channel, a diameter of the second ring groove being smaller than a diameter of the first ring groove, the second ring groove being surrounded by the first ring groove, said filter screen being a cylindrical structure with a downward opening, a bottom edge of said filter screen being positioned in the second ring groove.

* * * * *